May 3, 1960
A. L. WORRALL, JR
2,934,967
BELT AND GEAR DRIVE
Filed Nov. 22, 1957
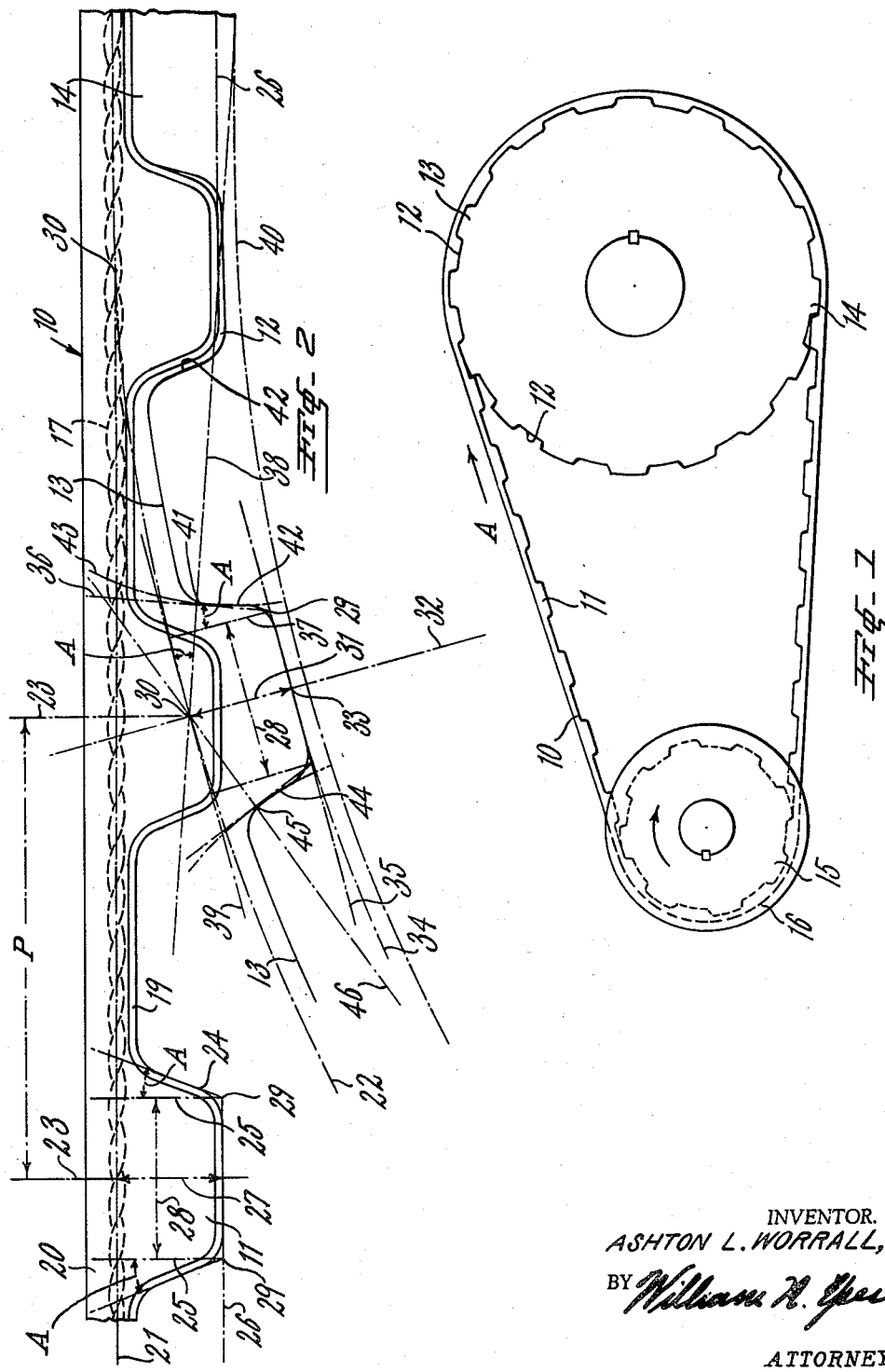
INVENTOR.
ASHTON L. WORRALL, Jr.
BY *William N. Ipes*
ATTORNEY

United States Patent Office 2,934,967
Patented May 3, 1960

2,934,967
BELT AND GEAR DRIVE

Ashton L. Worrall, Jr., Edison, Pa., assignor to United States Rubber Company, New York, N.Y., a corporation of New Jersey Application November 22, 1957, Serial No. 698,112

9 Claims. (Cl. 74—229)

This invention relates to a power transmitting mechanism comprising the combination of a flexible belt and spur gears in which the gears are provided with teeth having involute faces capable of meshing with teeth on the belt without interference and with conjugate action.

Interference results when portions of teeth of the belt and gears are deflected by each other from the path such portions should follow when meshing with each other to produce uniform and continuous motion. Such deflection may be effected by a deformation of the teeth, if they are deformable, or by incorrect shaping of the working faces of the teeth so that they exert accelerating and decelerating actions on each other. Such interference causes high local, momentary tooth loads and deformations and momentary changes in velocity which in turn cause detrimental vibrations in the mechanism and uneven transmission of motion, as well as a decrease in the useful life of the mechanism.

It is an object of this invention to increase the life of the power transmitting mechanism.

Another object is to decrease vibrations in the mechanism, and to transmit an even or smooth flow of power at all speeds.

The above and other objects of this invention are further described in reference to the accompanying drawings, in which:

Fig. 1 is an elevational view of the combination embodying this invention of a belt and two spur gears having teeth meshing with teeth on the belt; and Fig. 2 is an enlarged side elevation of a portion of the belt and a gear shown in Fig. 1, and illustrating a portion of the belt in the process of meshing with a gear tooth.

This invention is illustrated herein in reference to the combination of a flexible belt having deformable resilient teeth thereon of the type disclosed in United States Patent No. 2,507,852 to Case and gears having rigid teeth, but belts, such as metal belts, having non-deformable teeth thereon may also be used in such combination.

As shown in the drawings, the power transmitting mechanism comprises a flexible belt 10 having teeth 11 which are received in the grooves 12 between the teeth 13 of the gears 14 and 15 on which the belt runs. One or both of the gears 14, 15 may be provided with a guide flange 16, as shown on the gear 15, for retaining the belt on the gears.

Referring to Fig. 2, the belt 10 has a load carrying member 17, which may be made of a plurality of convolutions of a flexible continuous strand having a low degree of stretch as described in the aforesaid patent to Case. The resilient rubber teeth 11 are bonded to the member 17 and may or may not be covered with a wear resistant jacket 19. Where a jacket is used it may be rubber impregnated nylon or other fabric. An upper layer 20 of rubber is applied to the upper surface of the flat convolutions of strands forming the load carrying member 17.

The pitch line for the belt teeth 11 lies on the neutral axis of the belt 10, which is located at the center of the thickness of the load carrying member 17. Such center is referred to herein as the neutral axis or pitch line 21 of the belt.

In order that the belt teeth may mesh with the gear teeth without interference, the pitch line 21 of the belt 10 must coincide with the pitch circle 22 of the gears where the belt passes around the gears, and any selected pitch of the teeth must evenly divide the length of the circumferences of the pitch line of the belt and of the pitch circle of the gears.

It has been found even though the foregoing conditions are met, interference occurs between the teeth of the belt and gear teeth, unless the faces of the gear teeth are properly shaped to permit the belt teeth 11 to freely enter the grooves 12 between the gear teeth 13, although the grooves 12 may be of the same shape and larger than the belt teeth 11.

In accordance with this invention the interference of the belt and gear teeth is eliminated by making the working faces of the belt teeth plane surfaces as opposed to curved surfaces and providing the gear teeth with involute working faces derived from a base circle for such gear having tangents intersecting said pitch circle and making an angle with a tangent to the pitch circle at the point of the intersection equal to any selected pressure angle of said belt teeth. The term "working faces" as used herein refers to that portion of the faces of the gear and belt teeth which constitute the involute faces of the gear teeth and plane faces of the belt teeth which contact therewith.

In the production of the power transmission mechanism, preferably the design of the belt 10 is first determined and the construction of the gears is determined to cooperate with the belt design. To lay out the belt 10, the pitch P of the belt teeth 11 is laid out on the pitch line 21 of the belt and is indicated by the distance between the centers 23 of the belt teeth. The dimensions of the teeth 11 are laid out symmetrically from the center 23 so that the selected pressure angle A (which may be between 14° and 32°) is included between the faces 24 of the teeth and a perpendicular 25 dropped from the pitch line 21, and passing through the intersection of the face 24 with the addendum line 26 of the belt teeth. In so doing the addendum line 26 is first established by drawing it parallel to the pitch line 21 at a distance from the pitch line equal to the selected addendum 27 of the belt tooth 11. One-half of the width 28 of the tooth 11 is then laid out along the addendum line 26 on each side of the center line 23 to establish the corners 29 of the belt tooth (the distance between such corners being the width of the belt teeth) before they are rounded with a suitable radius as shown in full lines. The faces 24 of belt teeth and the perpendicular lines 25 intersect the addendum line 26 at the corners 29. The angular outline of the belt tooth 11 is bounded by the lines 26, 24 and 21.

The gear 14 is now constructed to cooperate with the belt 10 by first drawing the pitch circle 22 of the gear so that the pitch line 21 of the belt is tangent to the circle 22. The circular pitch of the gear teeth 13 must be the same as the linear pitch P of the belt teeth, and such pitch is laid out on the pitch circle 22 between the pitch points 30 of the grooves 12 between the teeth 13. The addendum 27 of the belt teeth is equal to the dedendum 31 of the gear teeth, which latter is laid out along the radius 32 of the gear inwardly from the pitch point 30 of a gear groove 12 to form a point 33 on the dedendum circle 34 of the gear 14. It will be noted under these conditions the belt teeth are all addendum and the cooperating gear teeth are all dedendum. A tangent 35 to the dedendum circle 34 is drawn through point 33.

Now the angular outline of the belt tooth 11 is drawn in the gear groove 12 as the tooth would appear when fully meshed between two gear teeth 13. To do so, the gear radius becomes the center line of the belt tooth and the tangent 34 becomes the addendum line of such tooth. One half of the width 28 of the belt tooth 11 is laid out along the tangent 35 from the point 33 to establish the corner 29 of the tooth 11. A line 36 is then drawn through the point 29 at an angle A to a perpendicular 37 to the tangent 34 to represent the face 24 of the belt tooth. A line 38 is drawn through the pitch point 30 at the center of the gear groove 12, so that the pressure angle A is included between the line 38 and a tangent 39 to the pitch circle 22 at the pitch point 30. The line 38 will be perpendicular to line 36 and tangent to the base circle 40, which is concentric to the pitch circle 22.

The base circle 40 may also be determined by computing its diameter, which is equal to the diameter of the pitch circle multiplied by the cosine of the pressure angle A. Having determined its diameter, the base circle may be drawn concentric to the pitch circle 22. In such case a tangent to the base circle thus drawn and passing through the pitch point 30 will coincide with line 38.

The line 38 intersects the line 36 (representing the face of a belt tooth) at the point 41, which establishes a point on the involute face of the gear tooth 13. The contour of the involute face 42 of the gear tooth is formed by plotting the path of the point 41 under the condition that it is on a flexible member such as a string, attached to the base circle 40 at the point of tangency of the line 38 to the circle, and the string is wound counterclockwise under tension around the circle 40 until the path 43 of the point 41 intersects the dedendum circle 34.

The involute face 44 for the other side of the tooth 13 is determined in same manner as the face 42, excepting after locating the point 45 corresponding to the point 41, the involute face 42 is determined by tracing the path of the point 45 on a flexible member 46 tangent to the base circle 40 when wound clockwise around the circle. The opposite faces of all the gear teeth may be determined in the same manner.

As shown and described herein no clearance is provided in the gear teeth grooves 12 for the belt teeth 11, but suitable clearance should be provided to compensate for manufacturing inaccuracies.

Having laid out the belt and gear drive as described herein, those skilled in the art may produce the belt and gear by well known conventional methods of molding and gear cutting.

This system of belt and gear transmission operates best where the diameter of the pitch circle of the gear exceeds a certain minimum which is reached when the pitch diameter of any gear decreases to a point where the product of the pitch diameter multiplied by the cosine of the pressure angle A is greater than the diameter of the dedendum circle of the gear. When the pitch diameter falls below this minimum, the tooth on the gear is undercut to avoid interference, which results in a reduction in the strength of the gear teeth and in the life of the belt teeth.

The preferred form of this invention has been described herein, but changes may be made therein without departing from the spirit of the invention, and it is intended to cover all such changes coming within the scope of the appended claims.

Having thus described my invention, what I claim and desire to protect by Letters Patent is:

1. A power drive comprising at least two gears having teeth on their peripheries and a flexible belt having teeth thereon adapted to mesh with said gear teeth, each of said gears having a pitch circle which lies outside of the circle of the top of the teeth of the gears the pitch points for said gear being located on said pitch circle, said belt having a neutral axis which coincides with said pitch circles where said axis curves around said gears, each of said belt teeth having plane working faces, said gear teeth of each gear having involute working faces, such that lines tangential to a base circle of said involute faces and passing through the pitch point for the corresponding gear tooth are perpendicular to said plane faces of said belt teeth when said belt teeth are fully meshed with said gear teeth.

2. A power drive comprising at least two gears having teeth on their peripheries and a flexible belt having teeth thereon adapted to mesh with said gear teeth said gear having spaces between successive gear teeth, each of said gears having a pitch circle which lies outside of the circle of the top of the teeth of the gears, said belt having a neutral axis which coincides with said pitch circles where said axis curves around said gears, each of said belt teeth having plane working faces, said gear teeth of each gear having involute working faces derived from a base circle for such gear having tangents perpendicular to said plane faces of said belt teeth fully meshed with said gear teeth and passing through the intersection of the pitch circle and a radius bisecting the space between said gear teeth.

3. A power drive comprising at least two gears having teeth on their peripheries and a flexible belt having teeth thereon meshing with said gear teeth, each of said gears having a pitch circle which lies outside of the circle of the top of the teeth of the gears, said belt having a neutral axis which coincides with said pitch circles where said axis curves around said gears, each of said belt teeth having plane working faces, said gear teeth of each gear having involute working faces derived from a base circle for such gear having tangents intersecting said pitch circle and making an angle with a tangent to the pitch circle at said point of intersection equal to any selected pressure angle of said belt teeth.

4. A power drive comprising at least two gears having teeth on their peripheries and a flexible belt having teeth thereon adapted to mesh with said gear teeth said gear having spaces between successive gear teeth, each of said gears having a pitch circle which lies outside of the circle of the top of the teeth of the gears, whereby said gear teeth are entirely dedendum, said belt having a load carrying member having a neutral axis which forms the pitch line of said belt teeth, said belt teeth extending entirely beyond said pitch line and being entirely addendum, said pitch line and said pitch circles coinciding where said belt curves around said gears, each of said belt teeth having plane working faces, said gear teeth of each gear having involute working faces derived from a base circle for such gear having tangents perpendicular to said flat faces of said belt teeth fully meshed with said gear teeth and passing through the intersection of the pitch circle and a radius bisecting the spaces between said gear teeth.

5. A gear having teeth thereon adapted to mesh with the teeth of a belt having plane working faces arranged at a selected pressure angle, said gear having teeth provided with involute working faces, said working faces of said gear teeth being wholly dedendum and the tops thereof lying within the pitch circle of said gear, said involute working faces being derived from a base circle for such gear having tangents intersecting said pitch circle and making an angle with a tangent to the pitch circle at the point of intersection equal to the said selected pressure angle of the teeth of the belt.

6. As claim 1, in which at least one gear has at least one guiding member comprising flange means extending from the bottom of the gear teeth, whereby the groove between the gear teeth is bounded along a surface extending substantially in the same direction as the flat side of the gear.

7. As claim 2, in which at least one gear has at least one guiding member comprising flange means extending from the bottom of the gear teeth, whereby the groove between the gear teeth is bounded along a surface extending substantially in the same direction as the flat side of the gear.

8. As claim 5, in which the gear has at least one guiding member comprising flange means extending from the bottom of the gear teeth, whereby the groove between the gear teeth is bounded along a surface extending substantially in the same direction as the flat side of the gear.

9. As claim 4, in which at least one gear has at least one guiding member comprising flange means extending from the bottom of the gear teeth, the groove between the gear teeth thereby being bounded along a surface extending substantially in the same direction as the flat side of the gear.

References Cited in the file of this patent

UNITED STATES PATENTS

| | | |
|---|---|---|
| 2,397,312 | Forrest | Mar. 26, 1946 |
| 2,507,852 | Case | May 16, 1950 |
| 2,718,790 | Hughey | Sept. 27, 1955 |
| 2,770,517 | Zabriskie | Nov. 13, 1956 |

OTHER REFERENCES

"The Involute Gear," published by "The Fellows Gear Shaper Company," Springfield, Vermont; copyright, 1920; pages 17, 20, 33, 34 and 43.